W. F. CARKIN.
COMBINATION KNIFE.
APPLICATION FILED JUNE 16, 1910.
987,548.
Patented Mar. 21, 1911.
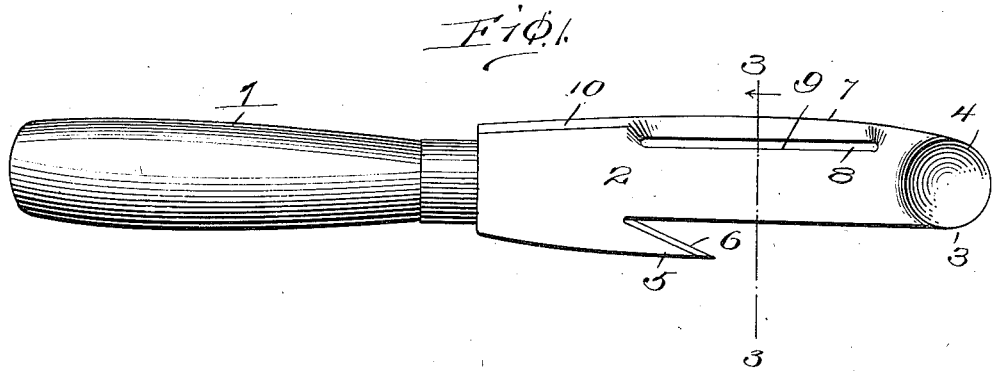
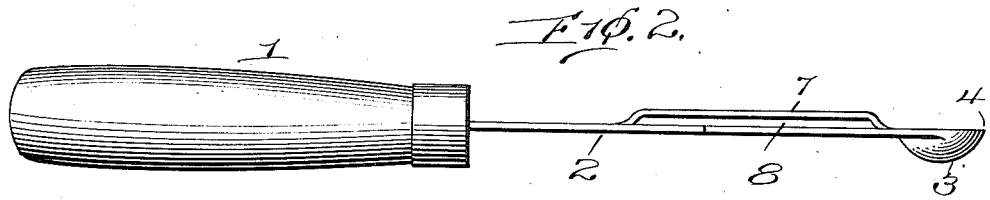
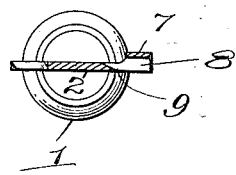

UNITED STATES PATENT OFFICE.

WILLIAM F. CARKIN, OF MARLBORO, NEW HAMPSHIRE.

COMBINATION-KNIFE.

987,548.  Specification of Letters Patent.  Patented Mar. 21, 1911.

Application filed June 16, 1910. Serial No. 567,273.

*To all whom it may concern:*

Be it known that I, WILLIAM F. CARKIN, a citizen of the United States, residing at Marlboro, in the county of Cheshire and State of New Hampshire, have invented certain new and useful Improvements in Combination-Knives, of which the following is a specification.

My invention relates to improvements in combination knives, and the leading object of my invention is the provision of a combination knife which will provide in a single unitary structure a plurality of implements having different but closely related functions.

The further object of the invention is the provision of a knife having a blade adapted for use either for paring or cutting, for opening cans or for removing eyes from potatoes or pineapples.

To attain the desired objects my invention comprises a handle having secured thereto a blade having a sharpened lug projecting from one side thereof for opening cans and having integral gouging and cutting portions and a guard for a portion of the cutting edge, the invention further residing in the novel features of construction and combination and arrangement of parts for service substantially as shown in the accompanying drawings and as hereinafter described.

Figure 1 represents a side view of my knife. Fig. 2 represents a rear edge view thereof, and Fig. 3 represents a sectional view of the knife on line 3—3 of Fig. 1.

The numeral 1 designates the handle of my knife having secured thereto the blade designated as a whole by the reference character 2, said blade having formed at its outer end the substantially hemispherical portion 3, having a sharpened or beveled edge 4, said portion being adapted to be inserted in a pineapple or potato to extend under and cut or gouge the eye therefrom without damaging the interior of the fruit as would a straight pointed member.

Projecting from the back of the blade at an angle thereto is the pointed lug 5 adapted to have its point inserted in a can, said lug having a sharpened edge 6 adapted to be forced upward to cut the can, the back of the blade bearing against the can and serving as a fulcrum for the can opener.

As best shown in Fig. 2, the front edge of the blade has a portion 7 pressed or forced upward therefrom providing the slot 8 between it and the blade, while the blade adjacent said slot has its front edge sharpened at 9 to provide a peeling portion, the upwardly pressed member 7 serving as a guard therefor to prevent undue cutting of the article being peeled.

For dividing fruit or vegetables or for other cutting operations where the edge 9 is inoperative on account of the guard, I provide the cutting edge 10 lying between the guard and the handle.

From the foregoing description taken in connection with the drawings the construction and operation of my improved combination knife will be readily understood and its advantages be fully appreciated and it will be seen that I have combined in one implement a plurality of the tools most commonly used in the preparation of fruit and vegetables and thus provide in compact shape a can opener, knife, paring knife with guard, and eye remover, said parts being moreover so combined as to provide a strong, simple and durable tool which can be manufactured and sold at about the same cost as any single one of said implements.

I claim:

A knife of the character described, comprising a handle, a blade having its inner end fitting in the handle and having its outer end terminating in a rounded cup-like portion, the intermediate portion of the blade near one edge being slotted and the edge being formed into an offset guard, the blade adjacent the inner end of the slot being sharpened to form a short paring edge, and the portion of the blade intermediate the guard and handle being sharpened to form a cutting edge, the opposite side of the blade contiguous to the handle being offset and formed with a pointed lug having a sharp inner edge to provide a can opener.

In testimony whereof I affix my signature, in presence of two witnesses.

WILLIAM F. CARKIN.

Witnesses:
 G. H. FOLLANSBEE,
 CYRUS H. KINSMAN.